(12) United States Patent
Brill et al.

(10) Patent No.: US 7,113,950 B2
(45) Date of Patent: Sep. 26, 2006

(54) AUTOMATED ERROR CHECKING SYSTEM AND METHOD

(75) Inventors: Eric D. Brill, Redmond, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/183,214

(22) Filed: Jun. 27, 2002

(65) Prior Publication Data
US 2004/0002994 A1    Jan. 1, 2004

(51) Int. Cl.
G06F 17/00 (2006.01)
G06F 7/00 (2006.01)

(52) U.S. Cl. .............................. 707/100; 707/6; 707/5
(58) Field of Classification Search ............... 707/2, 707/102, 6, 100, 7; 705/7
See application file for complete search history.

(56) References Cited

U.S. PATENT DOCUMENTS

| 5,715,469 | A |   | 2/1998 | Arning |
| 5,754,737 | A |   | 5/1998 | Gipson |
| 5,761,689 | A |   | 6/1998 | Rayson et al. |
| 5,826,253 | A | * | 10/1998 | Bredenberg ................ 707/2 |
| 5,864,805 | A |   | 1/1999 | Chen et al. |
| 6,014,615 | A |   | 1/2000 | Chen |
| 6,347,296 | B1 |   | 2/2002 | Friedland |
| 6,393,406 | B1 | * | 5/2002 | Eder .............................. 705/7 |
| 6,438,545 | B1 | * | 8/2002 | Beauregard et al. ........... 707/6 |
| 6,735,596 | B1 | * | 5/2004 | Corynen ..................... 707/102 |
| 2001/0025278 | A1 | * | 9/2001 | Yourto et al. .................. 707/2 |
| 2003/0191898 | A1 | * | 10/2003 | Supnet ....................... 711/133 |
| 2003/0229848 | A1 | * | 12/2003 | Arend et al. ................ 715/509 |
| 2003/0232314 | A1 | * | 12/2003 | Stout et al. ................. 434/322 |

OTHER PUBLICATIONS

OracleâSQL*PlusâUser's Guide and Reference, Release 3.3, 1996, Oracleâ.*
Andrew J. Carlson, "Scaling Up Context-Sensitive Text Correction", 2001, AAAI, (www.aaai.org).

* cited by examiner

Primary Examiner—John R. Cottingham
Assistant Examiner—Kuen S. Lu
(74) Attorney, Agent, or Firm—Amin & Turocy, LLP

(57) ABSTRACT

The present invention relates to a system and methodology to facilitate automated error correction of user input data via an analysis of the input data in accordance with an automatically generated and filtered database of processed structural groupings or formulations selected and filtered from past user activities. The filtered database provides a relevant foundation of potential phrases, topics, symbols, speech and/or colloquial structures of interest to users—which are automatically determined from previous user activity, and employed to facilitate automated error checking in accordance with the user's current input, command and/or request for information.

32 Claims, 9 Drawing Sheets

AUTOMATED ERROR CHECKING SYSTEM AND METHOD

TECHNICAL FIELD

The present invention relates generally to computer systems, and more particularly to a system and method to create a filtered database of desired structural groupings from aggregated raw data containing errors, wherein the filtered data is employed to facilitate error correction of user input data.

BACKGROUND OF THE INVENTION

Interaction with automated programs, systems, and services, has become a routine part of most people's lives—especially with the advent of the Internet. Web surfing or browsing for instance may even be the "new" national pastime for a certain segment of the population. In accordance with such systems, applications such as word processing have helped many become more efficient in their respective jobs or with their personal lives such as typing a letter or e-mail to a friend. Many automated features have been added to these applications such as tools for formatting documents in substantially any desired font, color, shape, or form. One tool that has been appreciated and well received by many users is a spell checking application that is either invoked by a user from the word processor to check all or portions of a respective document and/or invoked to run in the background to check spelling as users are typing. Generally, in order to perform accurate spell checking, a dictionary of "valid strings" may be employed by the spell checking application. If a spell checker encounters a string not in the dictionary, it may hypothesize that the string is a spelling error and attempt to find the "closest" string in the dictionary for the misspelled string. Most spell checkers provide a list of possible matches to the user, whereby if the match is on the list, the user can select the word having the corrected spelling from the list. Other spell checking features may perform automatic corrections—if so configured by the user.

Spell checking for word processing, however, presents only a partial view of potential areas that may be applicable to assist users when entering information into a file or document. For example, with all the potential web sites and services available, users often navigate between sites by explicitly typing in all or portions of the site name. As many have come to find out, if the site information is entered incorrectly, the cost in time to re-navigate can become quite high. Language processors employed in search engines or other applications often process user queries and may attempt to distinguish actual user commands from incorrectly entered information. As can be appreciated however, the type of information that may be entered for a query to a search engine may be quite different in structure or form than typically employed in a word processing application. Thus, tools that check words on a somewhat individual and isolated basis in a word processor application may have little or no utility when applied to information generated from general query data.

Browser or other type queries for information present a unique problem for spell checking applications, since the queries often consist of words that may not be found in a standard spell-checking dictionary such as proper names. Another problem is that a word in a query may have been entered incorrectly, but not be spelled incorrectly. Thus, the manner in which people enter text into a type-in line, for example, such as an input box to a search engine is often very different than typing for word processing. Both what is entered, and the types of errors people make with respect to query input are also quite different in nature. As such, a standard dictionary, while suitable for spell checking in the context of word processing, may not be appropriate for type-in-line spell checking.

A dictionary is an important component of any spell checker since the information contained therein provides the foundation to determine incorrect spellings. However, for many applications where spell checking is desired (e.g., text input provided to input boxes), a standard dictionary is not optimal for the problem. For instance, to spell check text input to the input box of a search engine, a dictionary should include strings such as "pictures of the President", "hanging chad", and "Apolo Anton Ohno" in order to check more recent events or information that may be of interest. As can be appreciated, these and a plurality of other type strings would not appear in a standard dictionary. One possible approach to creating such a dictionary may be to derive a subset of potential entries from a log of what users are typing into a particular location such as a search engine or language processor. Unfortunately, a problem with this approach is that the query logs will generally also contain a large number of spelling errors—which is a major reason why spell checking is employed in the first place. Since the logs contain errors, a lexicon built from the logs cannot be utilized reliably for spell checking.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate automated error correction of user input data via an analysis of the input data in accordance with an automatically generated and filtered database of processed structural groupings or formulations selected and filtered from past user activities. The filtered database provides a relevant foundation of potential phrases, topics, symbols, speech and/or colloquial structures of interest to users—which are automatically determined from previous user activity, and employed to facilitate automated error checking in accordance with the user's current input, command and/or request for information (e.g., audio data, symbolic data such as sign language or facial expression, text input directed to a language processor).

Raw data aggregated from a query database (e.g., collected from past queries to a remote site) is mined to determine an initial starting foundation or formulation for potential input errors that may have previously been entered into the query database. For example, pairings of potential correctly entered structures and incorrectly entered structures can be processed from the raw database to determine if one structure is an incorrect formulation of the other structure. An error model is then trained in accordance with the possible correct formulations and incorrect formulations, wherein the error model learns a probability of different spelling errors that have been made in accordance with the prior formulations. The trained model is then applied to the raw database to prune or filter the incorrect formulations from the database. This can be achieved by testing the database to determine if the frequency or occurrence of various spelling error types—as predicted by the model, are found in a sampling of the raw query data, and thus agree with the model. If the model suitably predicts the types and occurrences of errors in the raw database, a subsequent or "clean" database is created via the model by removing detected errors from the raw query logs. After filtering has occurred, the clean database can be employed as an error checking database in substantially any user input application such as browsers, search engines, word processors, language processors, computer interfaces, and so forth in order to facilitate correction of user input errors in connection therewith.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate error checking in accordance with a plurality of various user input applications (e.g., correcting input from a query string, from audio phrases, from symbolic expressions). Error checking is achieved by creating a filtered database from past user input activities and applying the database to facilitate error checking in accordance with present user input activities. Systems and methods are provided to automatically create the filtered database from query logs (or other database), for example, by automatically detecting and pruning out errors in the query logs.

Given a type-in line for a particular application, the filtered database provides a lexicon or data subset that can be employed to spell or error check a user's input such as from text, for example. The lexicon or subset can be derived empirically from the logs of what people are actually typing into a type-in line, for example. Given a log of strings (and/or structures) users have typed and/or input, a (noisy) lexicon of strings can be generated along with associated frequencies of appearance of such input. The lexicon or filtered database is then cleaned or filtered by finding and discarding strings (and/or structures) that are detected errors of other strings, for example. In order to remove incorrect entries from the filtered data subset that is created, the system compares the phrases to other phrases in the logs, and groups similar phrases accordingly. Assuming that most users enter the phrases correctly, the system then discards the low occurring entries from the groups. The filtered database created by the system would then likely recognize that a "Backstreet Bays" query would more likely be directed to a "Backstreet Boys" query given evidence of past queries of similar type.

Figure 1:
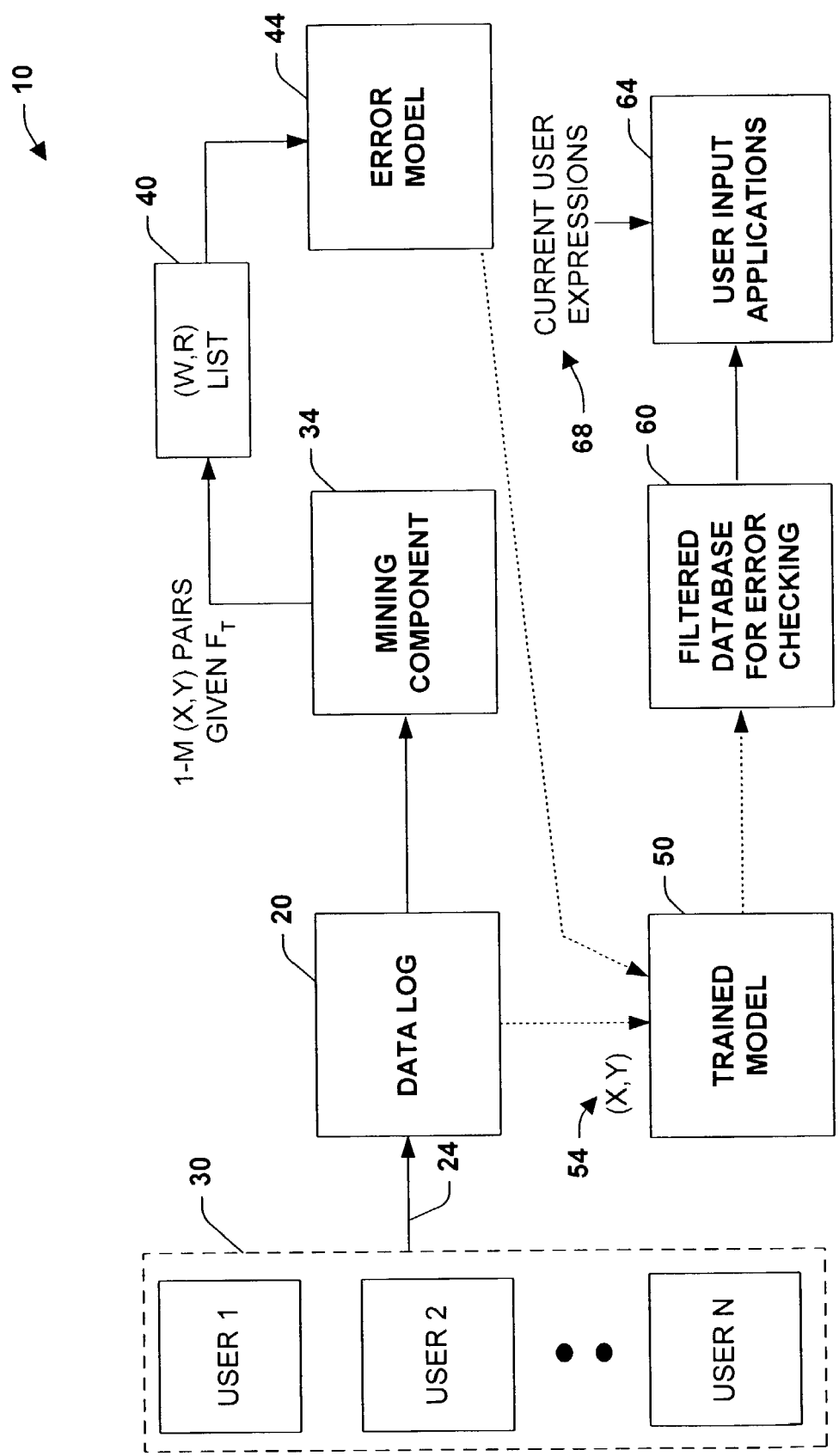
FIG. 1 is a schematic block diagram illustrating an error checking architecture in a distributed computing environment in accordance with an aspect of the present invention.

Referring initially to FIG. 1, a system 10 illustrates an error checking architecture in a distributed computing environment in accordance with an aspect of the present invention. A data log 20 captures or records input data 24 from 1 to N users 30 via one or more network and/or local data sources (not shown), N being an integer. The input data 24 can include substantially any type of user expression such as a text input directing a query, audio input derived from speech expressions, video/image data capturing facial, symbolic, and/or bodily expressions such as sign language, wherein the input data has been previously directed to such applications as word processors, browsers, language processors, video processors, audio processors, search engines, web services, web sites and so forth. Thus, the input data 24 represents past user activities indicative of potential topics, phrases, ideas, expressions, and/or queries of interest that have been directed from the users 30, for example.

Given evidence of past user input activities from the data log 20, a mining component 34 determines 1 to M (X,Y) pairs of potential correct and incorrect expressions, wherein X is likely to be an incorrect expression or formulation of Y and M is an integer. The (X,Y) pairs can be selected base upon a predetermined frequency threshold $F_T$ and/or other criteria that are described in more detail below, whereby $F_T$ describes the frequency of occurrence of a respective expression. A right/wrong list 40 (or other designations such as yes/no, 1,0), denoted as (W,R), is automatically created by the mining component 34 that describes potential or hypothetical pairings of expressions such that W or wrong describes a potential incorrect expression and R or right describes a potential correct expression that has been associated with the W expression.

An error model 44 is then formulated from the right/wrong list of expressions at 40 such that the model learns probabilities for different types of expression errors and is described in more detail below. After learning has occurred with the error model 44, a trained model 50 is illustrated that computes probabilities or estimates for a given (X,Y) pair at 54, describing how likely X is an incorrect expression of Y. Given the probabilities of the trained model determinations at 50, the data log 20 is then sampled to determine if the determined estimates of the trained model 50 correlate to the actual data appearing in the log. If a correlation is found or determined via the sampling, then it can be determined X is probably an incorrect formulation of Y, wherein one or more X expressions can then be removed or filtered from the data log 24 to automatically create/form a filtered database 60 composed of probabilistically determined expressions of Y. It is noted that probability thresholds can be set to determine whether or not predicted data correlates to sampled data (e.g., probability estimate of an incorrect formulation is within 90% of actual sampled or empirical data/result).

From the above determinations, the filtered database 60 can be employed as a foundational or framework component that provides error-checking data in accordance with one or more user input applications 64. For example, the filtered database 60 can be employed in a speech recognition application, symbolic/image recognition application, and/or text input application, for example. As one example, if users are required to interact with the respective applications 64 with a query or other type expression at 68, such as for example, "Hi mny planuts ar in teh solr sistum," the filtered database 60 can be searched to automatically provide or suggest a potential correct formulation such as "How many planets are in the solar system." As will be described in more detail below, chains of such past/current expressions can be formulated to determine potential incorrect/correct expression formulations. Moreover, the filtered database 60 can be periodically updated with current expressions and/or according to other aspects such as via iterative processing techniques that are determined in accordance with the above automated procedures and are described in more detail below.

FIGS. 1 through 8 illustrate systems and associated methodologies to facilitate automated error checking in accordance with the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
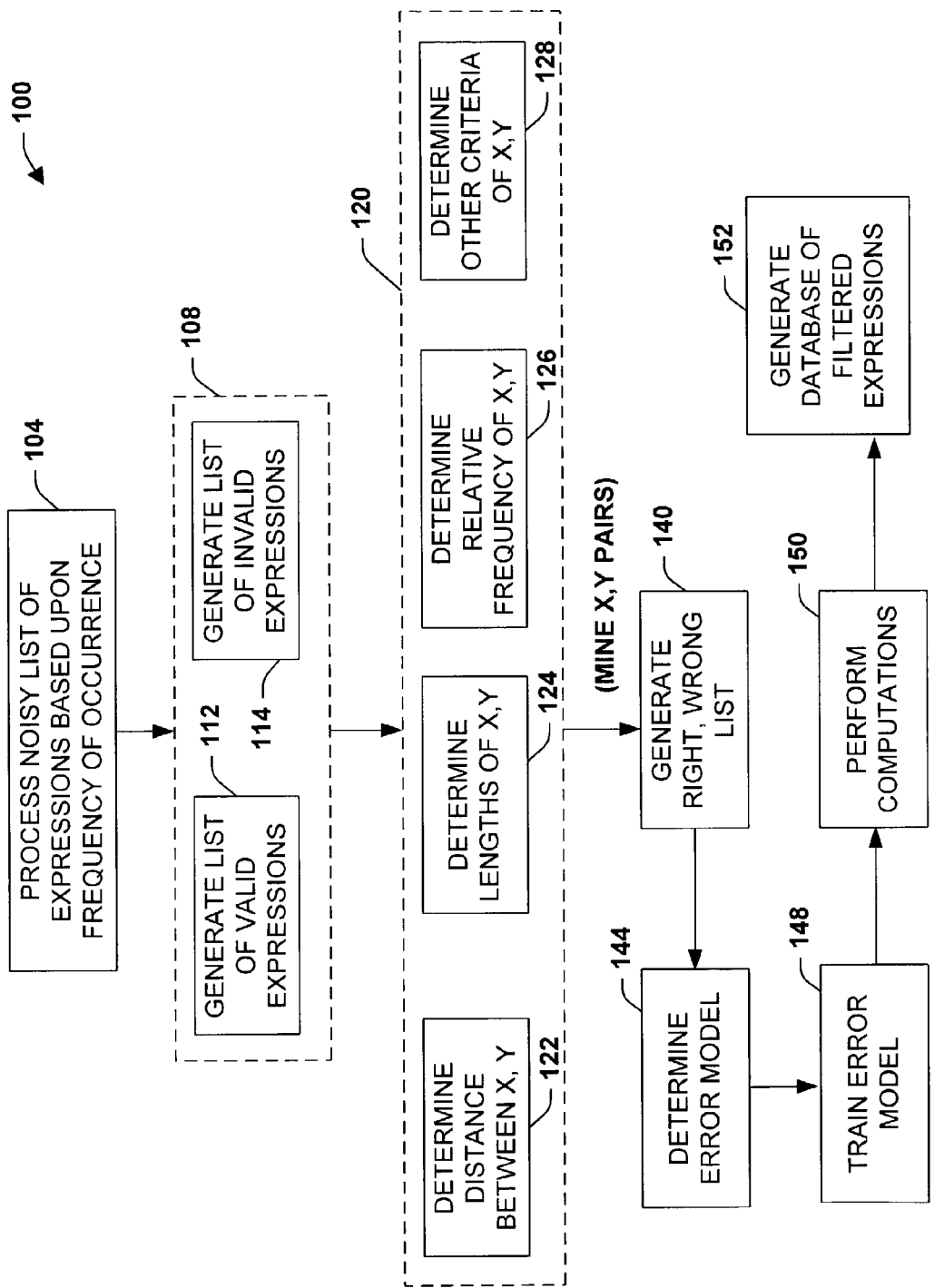
FIG. 2 is a flow diagram illustrating an automated error checking process in accordance with an aspect of the present invention.

FIG. 2 is a diagram illustrating a methodology 100 to facilitate automated error checking in accordance with an aspect of the present invention. It is noted that the following systems and procedures can be applied to substantially any type of indicated user expression and/or input such as text, audio, image data and so forth. Thus, if a term such as "string" or "lexicon" or "spell" is employed, these terms can also include other structures, data types and expressions. Proceeding to 104, and given a log of strings or expressions users have typed or entered, a (noisy, e.g., having errors) lexicon of strings and associated frequencies is processed. At 108, a list of strings (or expressions, structures) along with the frequency of occurrence of respective strings is generated. This list can include a list or subset of strings users have input to a type-in line or generated from a subset of such strings or expressions. In one aspect, a subset of strings is generated by pruning or segregating from the list of 104 to contain strings that occur at least N times for some N in order to generate the list of 108, N being integer. The list at 108 can contain valid strings/expressions 112 and misspelled strings and/or incorrectly formulated expressions 114.

From the list of strings at 108, a mining process 120 automatically mines pairs of strings X, Y wherein X is likely to be a misspelling or formulation of Y. To estimate how likely it is that X is a misspelling of Y, a number of criteria can be employed at 120:

At 122, an Edit distance between X and Y can be determined. For example, the closer two strings are, the more likely it is that one is a misspelling of another (e.g., elephent and elephant—with an edit distance of 1—are more likely to be the same word than elevator and elephant—with an edit distance of 5).

At 124, Lengths of X and Y can be determined. For example, given two strings with a short edit distance, the longer these strings are the more likely they are the same word (e.g., both string pairs (anr, ant) and (hippopotimus, hippopotamus) have an edit distance of 1, but the latter pair is more likely to contain the same word misspelled than the former).

At 126, Relative frequencies of X and Y can be determined. For example, it can be assumed that users spell a word correctly more often than they misspell the word. So if the frequency of X is less than the frequency of Y, this is further evidence that X is a misspelling of Y.

At 128, other criteria can be determined. For example if an image or symbol is being processed, such considerations as bit-map differences, color differences, shape differences, intensity differences, gradients and so forth between X and Y image components can be analyzed to determine if a shape or symbol is an incorrect or related expression of another symbol or sequence. Similarly, if audio expressions are being analyzed, differences between tones, inflections, phonemes, phrases and so forth between X and Y audio components can be analyzed to determine if a sound or phrase is an incorrect or related expression of another sound or phrase, for example.

By factoring in the above criteria at 120, the process proceeds to 140 and automatically derives a list of hypothesized (e.g., wrong, right) strings or expressions from the data of 108, wherein "wrong" is a misspelling (or incorrect formulation) of "right". It is noted that there will likely be errors in the list of (wrong, right) pairs at 140, however, training methods can be provided that are substantially tolerant to errors and are described in more detail below. After the collection of (wrong, right) pairs are assembled at 140, standard processes can be employed to compute an error model at 144 which is also described in more detail below. In one aspect, the error model at 144 learns a probability of different spelling or expression errors being made. For instance, in English, users often mistype "ie" as "ei" but generally do not frequently mistype "ph" as "d" for example. At 148 the error model of 144 is trained according to substantially any type of learning algorithm which is described in more detail below in relation to FIGS. 3 and 4.

When the error model has been trained at 148, computations can then be performed at 150 for any given pair of strings X, Y, how likely X is a misspelling or incorrect formulation of Y (according to the error model). If the relative frequencies of X and Y in raw or unprocessed query logs are consistent with the estimate at 150, then it can be hypothesized that X is indeed a misspelling of Y. For example, if according to the error model, users mistype (or express) "a" as "e" 1% of the time, and if a string "pancake" is observed/read about 1,000 times in the query log, and a string "pencake" is observed about 10 times, these frequencies are considered consistent with the error model—since "pencake" may be derived from "pancake" by changing an "a" to an "e" and the frequency of "pencake" is about 1% of the frequency of "pancake").

By employing the process described above at 100, a plurality of (X, Y) pairs can be generated, wherein X is likely to be a misspelling (and/or incorrect formulation) of Y. In an alternative aspect, the process 100 can be employed to process error chains as follows: If it determined that X is a misspelling of Y, and Y is a misspelling of Z, then it can be hypothesized/determined that both X and Y are misspellings of Z. For example, it may be determine that "filosephy" is a misspelling of "filosaphy", and that "filosophy" is a misspelling of "philosophy" and that by chaining, it can be can determined that both "filosephy" and "filosaphy" are misspellings of "philosophy." It is to be appreciated that a plurality of such chains can be constructed to determine a resultant misspelling and/or formulation. Given these error chains, misspelled strings can be deleted and/or presented as chains to a user for verification.

To further highlight chaining, a dictionary with error chains and associated processes for utilizing the error chains can be provided (e.g., the dictionary may be a structure where a correct string is marked as correct and an incorrect string points either to another incorrect string in a chain or to the correct string at the end of the chain). The following represents one possible formulation for processing chains in accordance with the present invention:

If it known that x is an error of y and y is an error of z and z is correct, then prune x and y from the dictionary OR leave x and y in, but mark them as errors OR leave x and y in and have both x and y point to z OR leave x and y in and have x point to y and y point to z.

If one of the latter two determinations is performed, then spell check over the chained data structure as follows:

Input string s;
Check if s is in the dictionary;
If it is in the dictionary then;
  if it is marked as a correct string, do nothing (no error);
  if it is marked as incorrect, return the correct string (either by following the error chain to termination or going directly to the correct string);
else /* not in dictionary */
  find closest string t in dictionary according to the error model;
  if t is marked as a correct string, return t (e.g., system corrected into a structure in the dictionary that is a valid string);
  if t is marked as incorrect, return the correct string (either by following the error chain to termination or going directly to the correct string);
As an example of the above process:
Assume the dictionary contains: eliphent ->eliphant ->elephant;
If a user types "elephant" the system checks in the dictionary, finds it, determines the entry is correct and does nothing;
If the user types "eliphant" the system checks in the dictionary, finds it, traces the chain and returns elephant;
If the user types "eliphennt" and for example, "eliphent" is the closest string in the dictionary then the system traces the chain and returns elephant.

After applying the above procedure 100 to raw or noisy query logs, a "clean" or filtered set or subset of strings/formulations can be generated at 152, wherein spelling and/or other type errors have been filtered out and/or mitigated. The set or subset of filtered data at 152 can then be employed as a lexicon for spell checking applications and/or employed for subsequent applications to check for user input errors when entering input and/or expression data.

Figure 3:
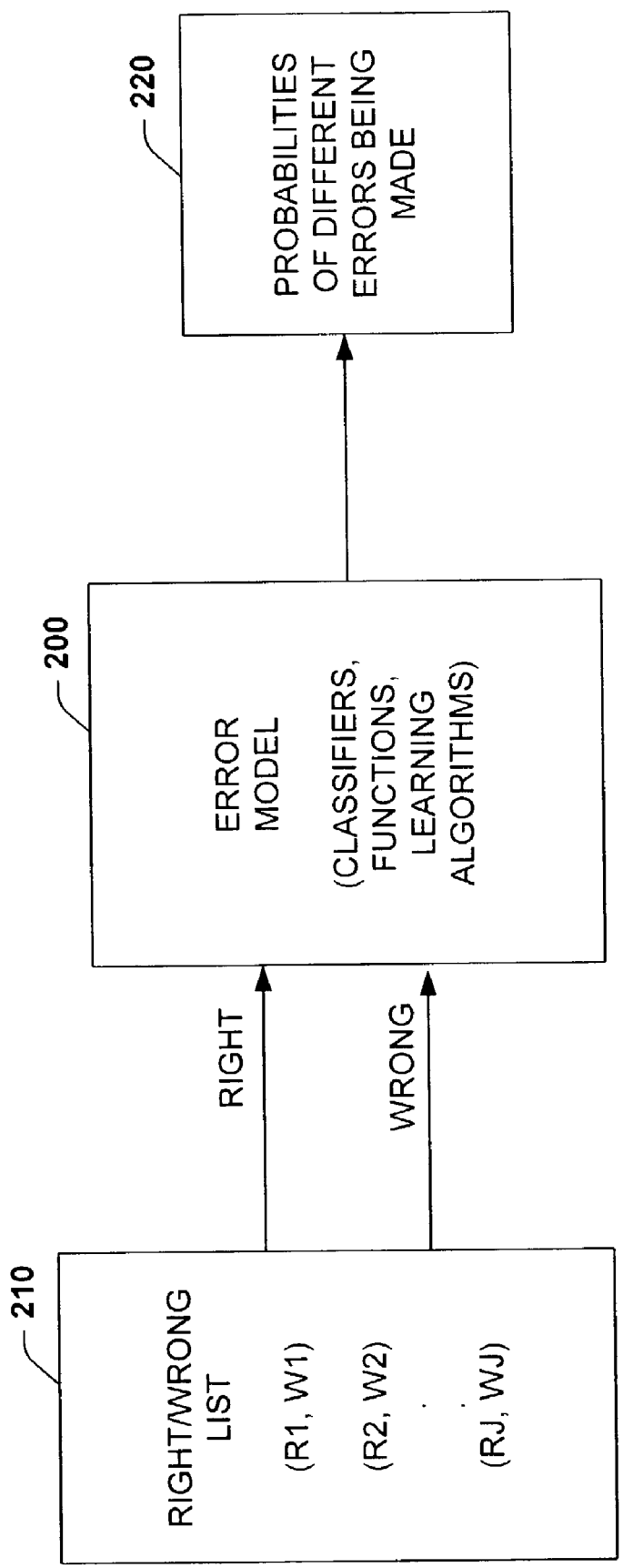
FIG. 3 is a diagram illustrating an error model and associated process list in accordance with an aspect of the present invention.

Referring now to FIG. 3, an error model 200 and associated process list 210 is illustrated in accordance with an aspect of the present invention. The process list 210 includes 1 to J pairings of right/wrong pairs as described above, J being an integer, wherein the error model 200 processes the pairings to determine one or more probabilities of various and/or different types of errors being made at 220. The error model 200 can include substantially any type routine, process, function, learning algorithm, circuit and/or model type in order to model, predict, and/or describe various errors via the probabilities (and/or thresholds, frequencies) generated 220. In one aspect of the present invention, the error model 200 can employ classification models that are constructed to learn expression structures or patterns in order to generate probabilities that predict possible future patterns. For example, such techniques can include Support Vector Machines (SVM), Naive Bayes, Bayes Net, decision tree, similarity-based, vector-based, and/or other learning models such as Hidden Markov Models or combinations thereof. Classifiers can be stated as a function that maps an input attribute to the confidence that the input belongs to a class. In the case of recognizing expression characteristics or data to determine or model expression patterns, attributes can be typical data subsets or values sampled over the course of time and/or include other pattern-specific attributes derived from the data subsets. In another aspect, the error model 200 can include a plurality of functions and/or probability equations, wherein respective functions are employed to determine a subset of error types. For example, a first function can be developed to describe character or expression transposition errors in a data set, whereas subsequent functions may describe likelihoods of letters or sequences being added and/or deleted, words/phrases being dropped, added, transposed, inserted, mis-entered, and so forth to and from an associated expression or input sequence.

Figure 4:
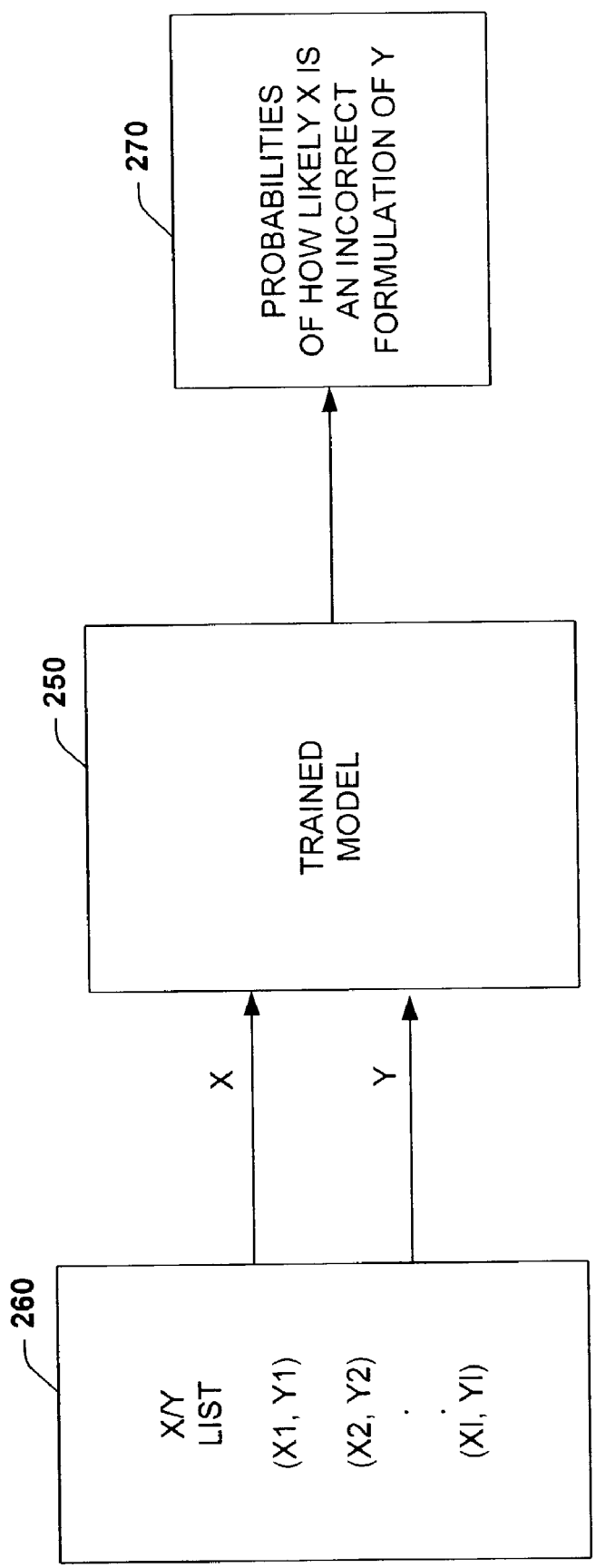
FIG. 4 is a diagram illustrating a trained error model and associated process list in accordance with an aspect of the present invention.

FIG. 4 is a diagram illustrating a trained error model 250 and associated process list 260 in accordance with an aspect of the present invention. The trained model 250 can be trained in accordance with one or more learning algorithms and/or model processes previously described. After the model 250 has been trained, X,Y pairings one through I can be submitted and processed by the model from the list 260, wherein I is an integer. It is noted that the X,Y pairings from the list 260 can include raw or unprocessed data, and/or can include data or queries that were previously processed in accordance with the systems and/or processes described above. As X,Y pairs are presented to the model 250, the model determines one or more probabilities 270 that determine how likely X is an incorrect formulation of Y. For example, a user may have input a sequence of sign language symbols (e.g., via camera input to computer) indicating the following query: "I want to sea pictures of Jupitor" wherein the trained model 250 determines that the user probably desires the following query: "I want to see pictures of Jupitor" based upon modeling of past input queries and the determination at 270. (Note the above query example is typed for discussion purposes, whereas in the example, the query was entered by a user entirely/partially via hand/bodily expressions, wherein the expressions could be modeled symbolically and/or converted to another form such as ASCII before subsequent processing by the trained model 250).

Figure 5:
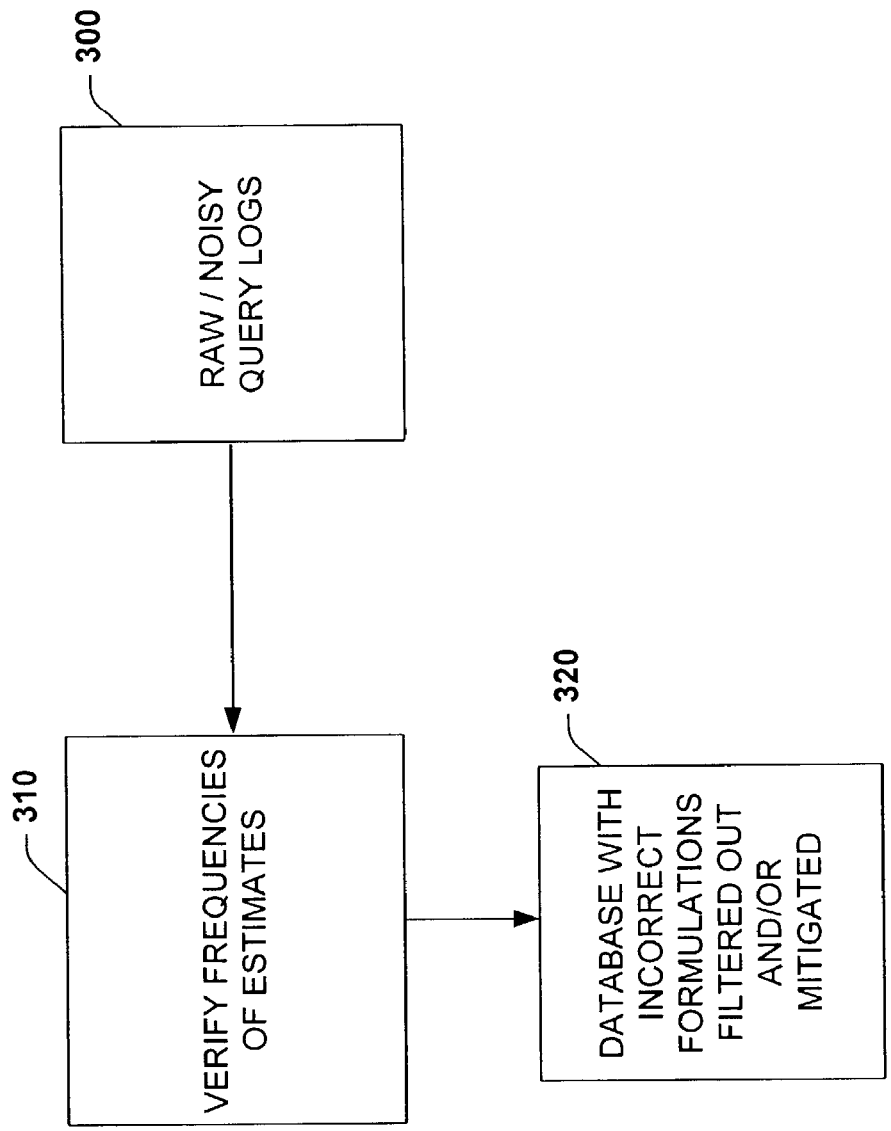
FIG. 5 is a diagram illustrating filtered database generation in accordance with an aspect of the present invention.

FIG. 5 is a diagram illustrating filtered database generation in accordance with an aspect of the present invention. At 300, raw and/or noisy query logs having accumulated input errors are sampled in accordance with the trained models described above. As noted above, the error estimates of the trained models can be verified according to the predicted frequencies suggested by such models at 310. For example, if the trained models suggest that transposition of letters occur about 14% of the time when analyzing a particular word or string, for example, then the frequency of the error should be found in the raw query logs at 300 that confirm or generally correlate with error outcomes predicted by the models (e.g., about 14% of queries or data in raw database have associated error). If the correlation is found or within some predetermined threshold of a desired correlation, a filtered database 320 is created having incorrect formulations or expressions filtered out and/or mitigated from the form of expressions represented in the raw query logs at 300 (e.g., when it is determined model predicts sampled errors, update filtered database with potential correct expressions and do not update database with determined incorrect expressions).

Figure 6:
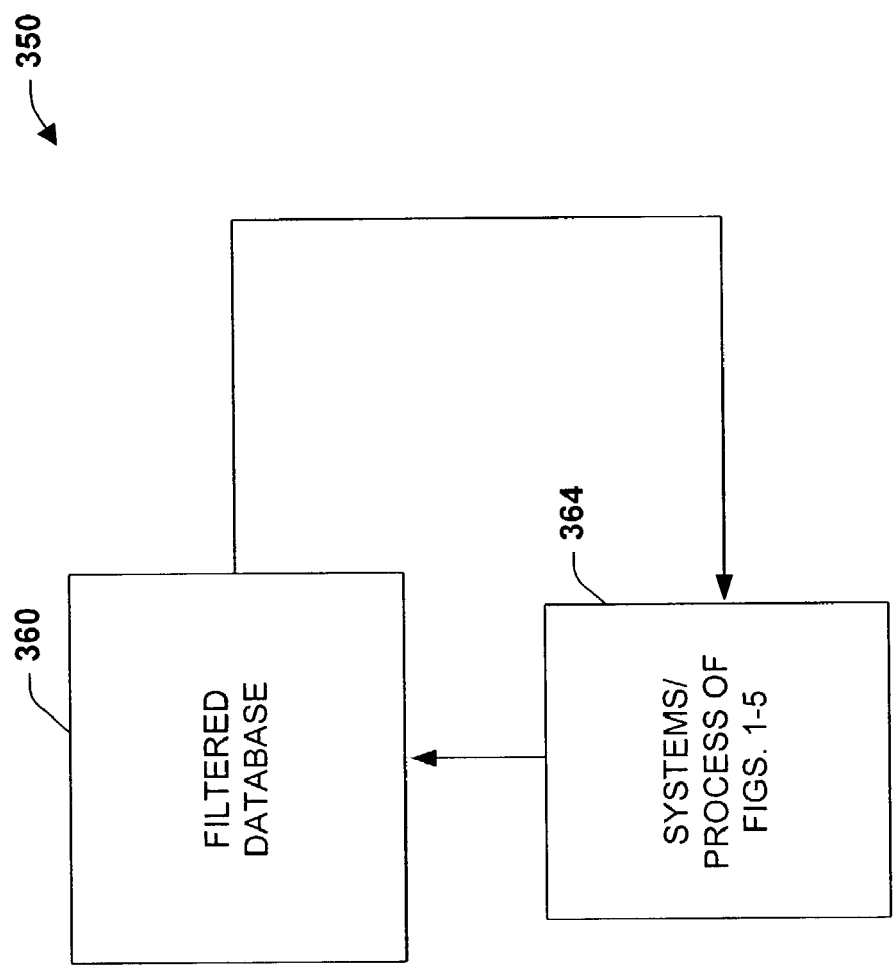
FIG. 6 is a diagram illustrating an iterative error correction process in accordance with an aspect of the present invention.

FIG. 6 is a diagram illustrating an iterative error correction process 350 in accordance with an aspect of the present invention. In this aspect, a filtered database 360 can be successively processed or iterated via the systems and processes previously described in relation to FIGS. 1–5 and applied at 364 to further refine the content in the database. For example, the procedures at 364 can be iterated to create a more accurate error model. In one aspect, an error model can be created from the (wrong, right) pairs previously described. The error model is then employed to more accurately detect (wrong, right) pairs and subsequently refine/update the database 360 with more accurate pairings. The more accurate pairs are then employed to retrain the error model, and so forth. As can be appreciated, a plurality of such iterations can occur if desired.

Figure 7:
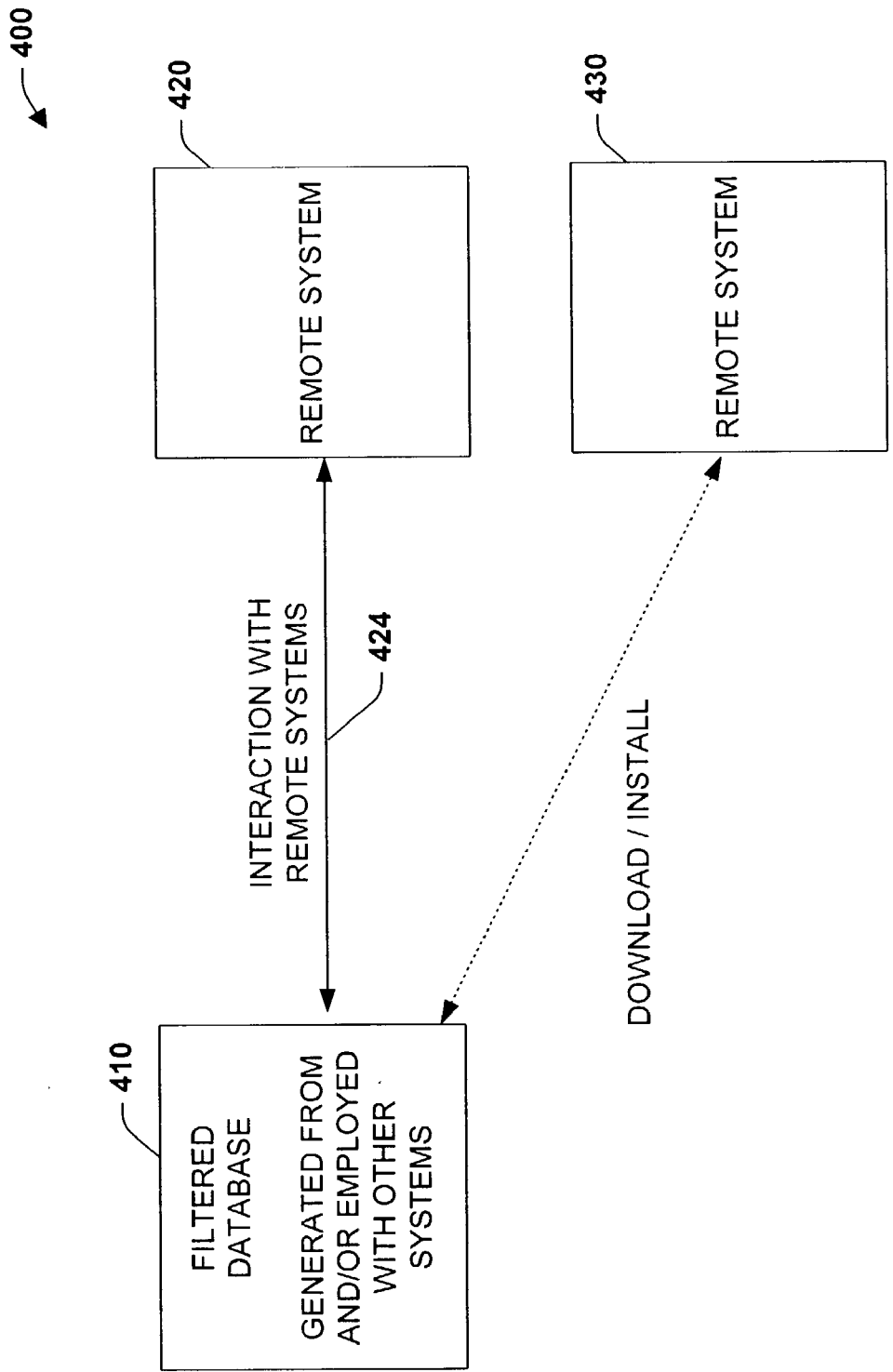
FIG. 7 is a diagram illustrating an interaction and deployment process in accordance with an aspect of the present invention.

FIG. 7 is a diagram 400 illustrating interaction and deployment aspects in accordance with an aspect of the present invention. A filtered database 410 is created in accordance with the procedures previously described. The filtered database 410 can the be employed by a remote system 420 to access the database in performance of a plurality of error checking applications which are described in more detail below. In one aspect of the present invention, the filtered database 410 can be provided (or operate with) as a web site, a web service, a remote server such as a SQL server and substantially any system that can provide data over a network 424. This can include providing error information in substantially any format such as in XML, SQL, HTML, WML, applets and so forth.

When the remote system (or applications associated therewith) desires to perform query or other type error checking, the query can be passed to the filtered database 410, wherein a response of possible correct formulations can be transmitted back to the remote system 420 via the network 24 (e.g., filtered database is associated with a browser that the remote system interacts with). In another aspect, the remote system 410 and others (not shown) can provide recently captured query data to the filtered database 410 on a periodic and/or scheduled basis such that the database is refined in accordance with current information and/or topics of interest. The recently captured query data can then be utilized to tune or refine the error models described above to further refine the database 410.

In another aspect of the present invention, all or portions of the content of the filtered database 410 can be downloaded and/or installed on a remote system 430 to facilitate error checking in the remote system. In one aspect, Internet (or other network) downloads of the database 410 can be performed (e.g., download from a web service) to the remote system 430 in order that the remote system (and/or application) can utilize the downloaded content from the database as a reference when performing error checking. As can be appreciated, other deployment options for the database contents can include transportation and loading via a computer-readable medium such a CD-ROM, DVD, floppy, and/or other type media readable by a computer.

Figure 8:
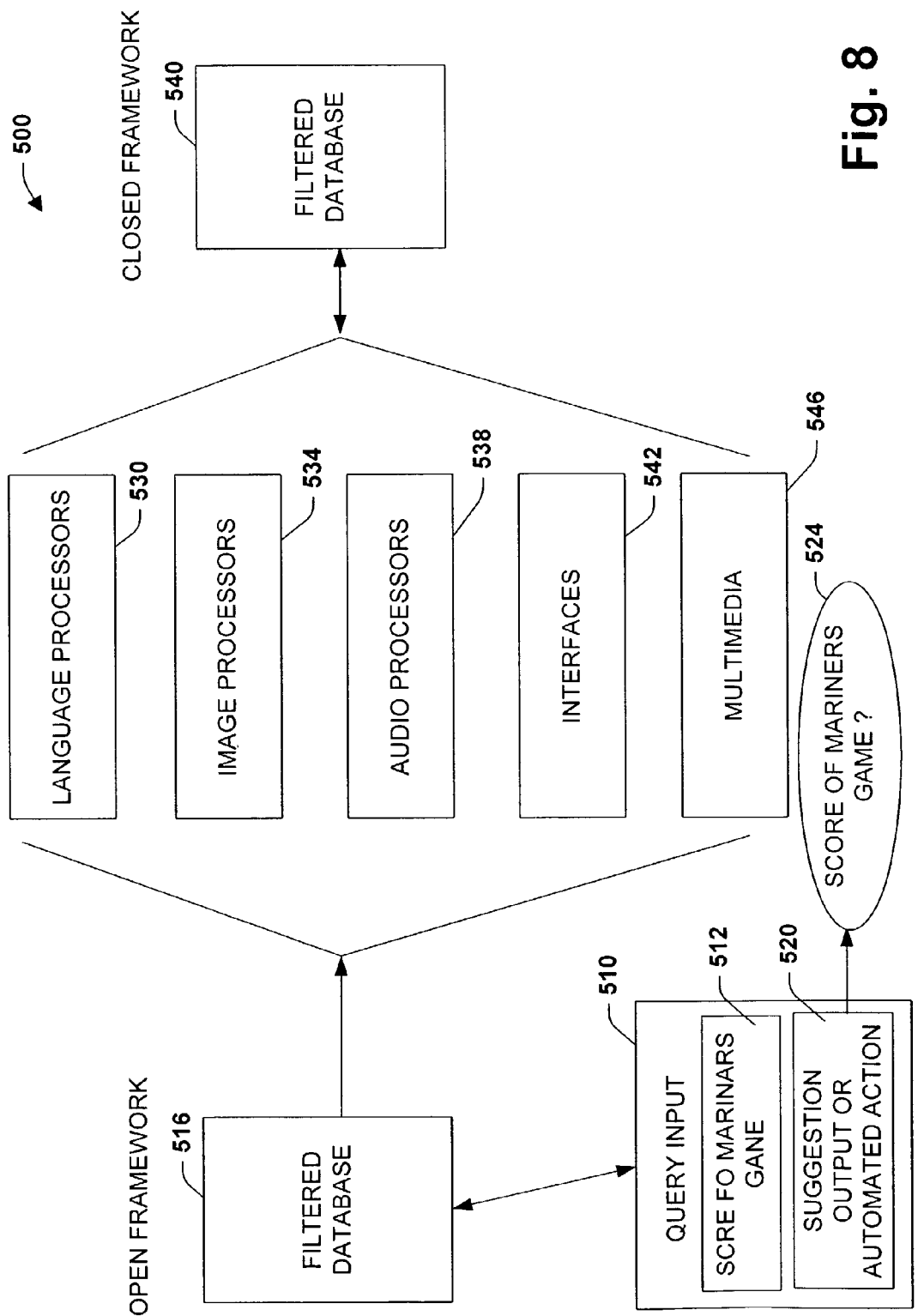
FIG. 8 is a diagram illustrating applications of an automated error checking architecture in accordance with an aspect of the present invention.

FIG. 8 is a diagram 500 illustrating applications of an automated error checking architecture in accordance with an aspect of the present invention. An example interface 510 is illustrated (e.g., Graphical User Interface), wherein an input box 512 receives a query from a user such as "scre fo marinars gane" for example. Contents of the input box 512 are then referenced to a filtered database 516 in order to determine a possible correct formulation for the user's query. In this example, which relates to a current baseball score, it is likely that other users have quested similar information, and thus a possible correct formulation is likely to be derivable from the filtered database 516. At 520, a display output is directed to the user with a suggested query or list of queries such as "Score of Mariners Game" at 524. It is noted that users can configure automated actions to occur such as automatically determine a correct query and apply the correct query if a probability threshold is exceeded (e.g., threshold describes confidence system has accurately predicted what user desires).

As can be appreciated, the filtered database 516 can be applied to substantially any type of application that utilizes one or more forms user input. These applications can include: language processors 530 such as word processors, natural language processors, search engines, encyclopedias, reference manuals, and dictionaries; image processors 534 such as may be provided from a system receiving facial or sign expressions from a user; audio processors 538 that may receive user queries or requests from such systems as a speech recognition system; interfaces 542 such as browsers, GUI's, web pages, web services, network interfaces, menus, help utilities; and multimedia applications 546 that may interact with various computer resources that receive user input such as drawing applications and CAD applications, for example.

It is noted that the filtered database 516 can be created and/or provided in what as referred to as an open framework or environment. In other words, potential queries that may be checked and/or modeled in accordance with the database 516, have been derived from a plurality of various different applications and/or query types. In another aspect of the present invention, a closed framework filtered database 540 can be provided. In other words, the filtered database can be adapted to a particular application or subset of applications (530–546). For example, the filtered database can be created/modeled from an encyclopedia application, wherein the filtered database is derived from past queries that pertain to the respective encyclopedia and the nuances/context therein. In this manner, accuracy of the filtered database 540 can be tuned/adjusted to the context and/or expressions that relate to the application. In another aspect, the filtered database 540 can be adjusted and/or tailored to a particular user or subset of users and/or in combination with a related application. For example, past queries from a respective user can be modeled to provide the database of expressions that have been entered by the respective user. Thus, the models can be further trained to potential errors that are likely to be made by the respective user or subset of users.

Figure 9:
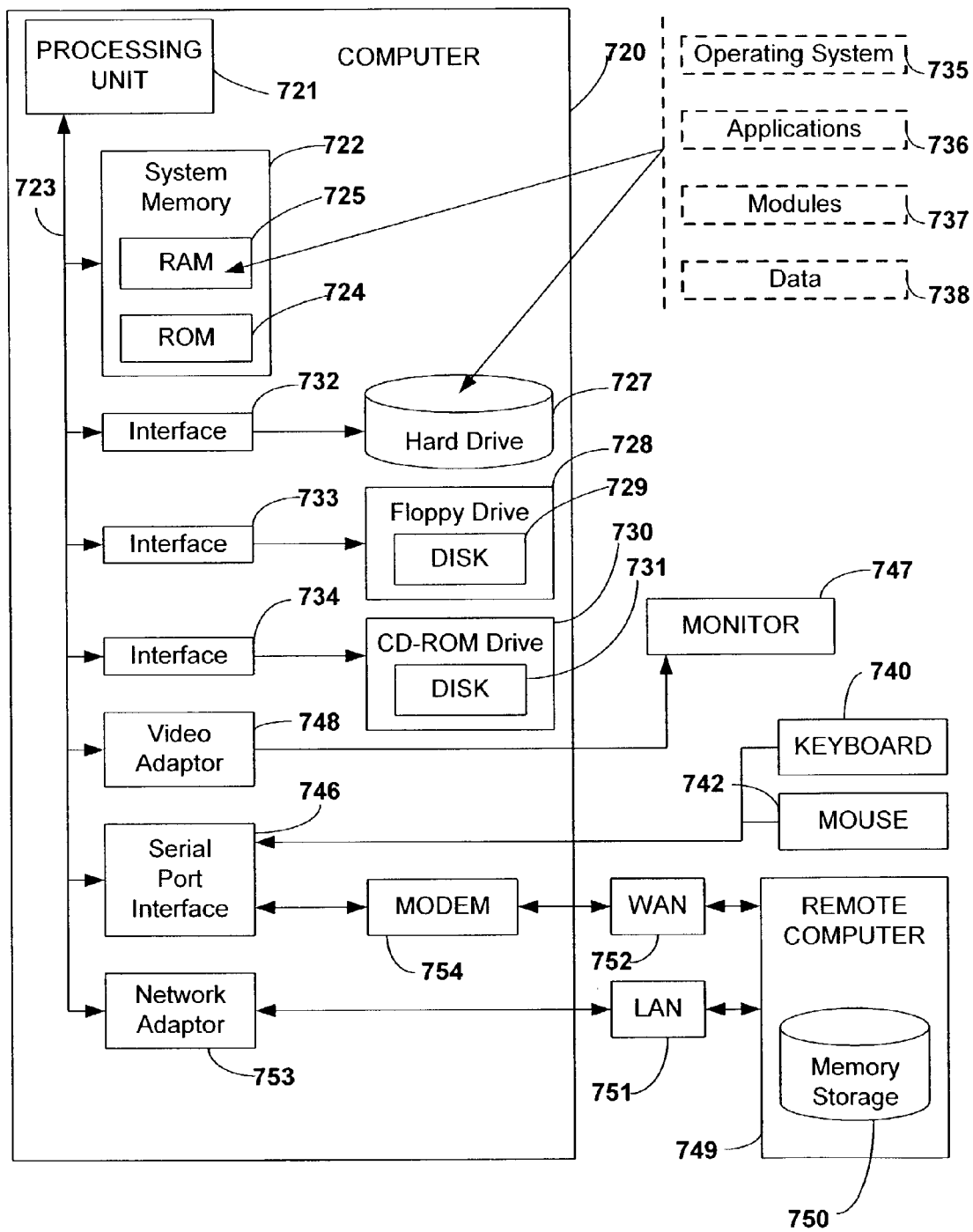
FIG. 9 is a schematic block diagram illustrating a suitable operating environment in accordance with an aspect of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 9. The logical connections depicted in FIG. 9 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented error checking database, comprising:
   a data subset derived in part from past user input data, the data subset is captured in a data log that records the past user input data from 1 to N users via at least one of a network and a local data source, N being a natural number;
   a subset of expressions automatically filtered from the data subset, the subset of expressions employed as a reference to facilitate error checking in accordance with current user input data;
   an automated mining component to determine 1 to M (X,Y) pairs of potential correct and incorrect expressions,
   wherein X is expected to be an incorrect formulation of Y and M a natural number, the (X,Y) pairs are selected in part based upon a predetermined frequency threshold ($F_T$),
   $F_T$ describes a frequency of occurrence of at least one of the X and Y expressions, the automated mining component creates a right/wrong list denoted as (W,R) to describe hypothetical pairings of expressions such that W describes a potential incorrect expression and R describes a potential correct expression that has been associated with the W expression; and
   an error model that is formulated from the right/wrong list of expressions such that the error model learns probabilities for different types of expression errors.

2. The system of claim 1, at least one of the past user input data and the current user input data includes an expression comprising at least one of a text input directing a query, an audio input derived from speech expressions, and a visual input capturing at least one of facial, symbolic, and bodily expressions.

3. The system of claim 2, at least one of the past user input data and the current user input data is directed to an application including at least one of a spell checker, a word processor, a browser, a language processor, an image processor, an audio processor, a search engine, a web service, a web site, an interface, and a multimedia application, the subset of expressions employed to facilitate error checking in accordance with the application.

4. The system of claim 1, the subset of expressions relate to at least one of topics, phrases, ideas, images, sounds, and queries of interest that have been directed from at least one user.

5. The system of claim 1, further comprising a trained model derived from learning processes of the error model that computes probabilities or estimates for a given (X,Y) pair describing how likely X is an incorrect expression of Y.

6. The system of claim 5, the trained model is employed to sample data log to determine if estimates of the trained model correlate to actual data appearing in the data log.

7. The system of claim 6, further comprising a database that is created by removing one or more X expressions from the data log to automatically form a filtered database composed of probabilistically determined expressions of Y.

8. The system of claim 6, further comprising at least one probability threshold that is configured to determine whether estimated data correlates to sampled data.

9. The system of claim 1, the subset of expressions are employed to automatically suggest at least one alternative query formulation in response to a user's current query formulation.

10. The system of claim 1, the subset of expressions are periodically updated with current expressions.

11. The system of claim 1, the subset of expressions are iteratively processed at least one time to further refine the subset of expressions.

12. The system of claim 1, the subset of expressions are determined in part by chaining at least two intermediate expressions.

13. A computer-readable medium having computer-executable instructions stored thereon to perform data processing in accordance with claim 1.

14. A computer implemented automated error checking method, comprising:
   modeling past user input data relating to at least one query; automatically creating an error checking database by filtering the past user input data in accordance with the modeling;
   automatically mining 1 to M (X,Y) pairs of potential correct and incorrect expressions,
      wherein X is expected to be an incorrect formulation of Y and M is a natural number, the (X,Y) pairs are selected in part based upon a predetermined frequency threshold ($F_T$),
      $F_T$ describes a frequency of occurrence of at least one of the X and Y expressions;
   creating a right/wrong list denoted as (W,R) to describe hypothetical pairings of expressions such that W describes a potential incorrect expression and R describes a potential correct expression that has been associated with the W expression; and
   formulating from the right/wrong list of expressions such that probabilities for different types of expression errors can be learned.

15. The method of claim 14, further comprising comparing the error checking database with a current query and suggesting a corrective expression to the current query from the database.

16. The method of claim 14, further comprising at least one of:
   processing a log of strings users have entered; and
   generating a noisy list of strings by determining a frequency of occurrence of the strings.

17. The method of claim 14, further comprising estimating how likely it is that X is a misspelling of Y, by at least one of an edit distance between X and Y, a length of X and Y, and a relative frequency of X as compared to Y.

18. The method of claim 14, further comprising estimating at least one of bit-map differences, color differences, shape differences, intensity differences, gradients, tonal differences, inflection differences, phoneme differences, and phrasal differences.

19. The method of claim 14, further comprising automatically deriving a list of hypothesized (wrong, right) strings, wherein "wrong" is a misspelling of "right".

20. The method of claim 14, further comprising determining for a given pair of strings X, Y, how likely X is a misspelling of Y by sampling unprocessed query logs to determine if modeled estimates are consistent with the logs.

21. The method of claim 14, further comprising processing an error chain having at least one other variable Z to determine if X is a misspelling of Y, and Y is a misspelling of Z, then it can be hypothesized/determined that both X and Y are misspellings of Z.

22. The method of claim 14, the modeling includes adapting at least one of a Support Vector Machine (SVM), a Naive Bayes, a Bayes Net, a decision tree, a similarity-based, a vector-based, and a Hidden Markov Models to perform the modeling.

23. The method of claim 14, the modeling includes adapting at least one function to determine at least one of a transposition error in a data set, a likelihood of letters being added, a likelihood of letters being deleted, a likelihood of words being at least one of dropped, added, transposed, inserted, and mis-entered.

24. The method of claim 14, further comprising iteratively processing the error checking database in order to refine associated contents therein.

25. A computer implemented automated error checking system, comprising:
    means for at least one of accessing and processing past user input data;
    means for modeling the past user input data;
    means for determining current user input data;
    means for providing at least one error suggestion in response to the current user input data based at least in part on the modeling of the past user input data;
    means for automatically mining 1 to M (X,Y) pairs of potential correct and incorrect expressions,
        wherein X is expected to be an incorrect formulation of Y and M is a natural number,
        the (X,Y) pairs are selected in part based upon a predetermined frequency threshold ($F_T$),
        $F_T$ describes a frequency of occurrence of at least one of the X and Y expressions;
    means for creating a right/wrong list denoted as (W,R) to describe hypothetical pairings of expressions such that W describes a potential incorrect expression and R describes a potential correct expression that has been associated with the W expression; and
    means for formulating an error model from the right/wrong list of expressions such that the error model learns probabilities for different types of expression errors.

26. A computer-readable medium having stored thereon a data structure, comprising:
    a first data field containing application data associated with a user interface;
    a second data field containing error correction data derived from an error model that is trained in accordance with previous user inputs;
    a third data field containing an automated mining component to determine 1 to M (X,Y) pairs of potential correct and incorrect expressions,
        wherein X is expected to be an incorrect formulation of Y and M is a natural number,
        the (X,Y) pairs are selected in part based upon a predetermined frequency threshold ($F_T$),
        $F_T$ describes a frequency of occurrence of at least one of the X and Y expressions,
        the automated mining component creates a right/wrong list denoted as (W,R) to describe hypothetical pairings of expressions such that W describes a potential incorrect expression and R describes a potential correct expression that has been associated with the W expression; and
    a fourth data field containing an error model that is formulated from the right/wrong list of expressions such that the error model learns probabilities for different types of expression errors.

27. The computer-readable medium of claim 26, the user interface further comprising at least one of an input location to receive present user inputs and an output location to provide suggestions in accordance with the error correction data.

28. The computer-readable medium of claim 26, the application includes at least one of a language processor, a word processor, a natural language processor, a search engine, an encyclopedia, a reference manual, a dictionary, an image processor, a speech recognition application, a browser, a GUI's, a web page, a web service, a network interface, a menu, a help utility and a multimedia application.

29. The computer-readable medium of claim 26, the error correction data is tailored in accordance with at least one of a closed environment, an open environment, a user, and a subset of users.

30. A computer implemented method to automatically create a dictionary, comprising:
    creating a dictionary having a structure wherein at least one correct string is marked as correct and at least one incorrect string is marked as incorrect, the correct and incorrect strings employable in a chain;
    determining a subsequent string that points to at least one of another incorrect string in the chain and to another correct string at an end of the chain to facilitate error checking in accordance with the dictionary; and
    determining that a string x is an error of string y and string y is an error of string z and if string z is correct, then performing at least one of the following:
        pruning determined string x and determined string y from the dictionary;
        maintaining pruned string x and pruned string y in the dictionary, but marking the pruned strings as errors;
        maintaining pruned string x and pruned string y in the dictionary;
        causing both maintained string x and maintained string y to point to determined string z; and
        maintaining pruned string x and pruned string y in the dictionary and having pruned string x point to pruned string y and pruned string y point to determined string z.

31. The method of claim 30, further comprising at least one of:
    inputting a string s;
    checking if the input string s is in the dictionary;
    determining if the checked string s is in the dictionary then:
        if the checked string s is marked as a correct string, do nothing;
        if the checked string s is marked as an incorrect string, return the correct string by at least one of:
            following a chain to a termination point; and
            proceeding to the correct string.

32. The method of claim 31, further comprising at least one of the following:
    determining that the checked string s is not in the dictionary;
    finding a closest string t in the dictionary according to an error model;
    if the closest string t is marked as a correct string, then returning t;
    if the closest string t is marked as incorrect, returning the correct string by at least one of:
        following a chain to a termination point; and proceeding to the correct string.

* * * * *